United States Patent
Manoharan et al.

(10) Patent No.: US 12,511,532 B2
(45) Date of Patent: Dec. 30, 2025

(54) MULTI-CHILLER SCHEDULING USING REINFORCEMENT LEARNING WITH TRANSFER LEARNING FOR POWER CONSUMPTION PREDICTION

(71) Applicant: Tata Consultancy Services Limited, Mumbai (IN)

(72) Inventors: Praveen Manoharan, Chennai (IN); Malini Pooni Venkat, Chennai (IN); Srinarayana Nagarathinam, Chennai (IN); Arunchandar Vasan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1075 days.

(21) Appl. No.: 17/136,957

(22) Filed: Dec. 29, 2020

(65) Prior Publication Data

US 2021/0303998 A1 Sep. 30, 2021

(30) Foreign Application Priority Data

Mar. 28, 2020 (IN) .............................. 202021013671

(51) Int. Cl.
 - *G06N 3/08* (2023.01)
 - *F25D 3/00* (2006.01)
 - *G06N 3/04* (2023.01)

(52) U.S. Cl.
CPC ................ *G06N 3/08* (2013.01); *F25D 3/00* (2013.01); *G06N 3/04* (2013.01)

(58) Field of Classification Search
CPC ............ G06N 3/08; G06N 3/04; G06N 3/088; G06N 3/006; G06N 3/0895; G06N 3/09;

(Continued)

(56) References Cited

U.S. PATENT DOCUMENTS

2008/0162077 A1* 7/2008 Chang ..................... F24F 11/63
   702/182
2013/0098084 A1* 4/2013 Matsuo ................... F25B 49/00
   62/129

(Continued)

FOREIGN PATENT DOCUMENTS

AU       2018202477 B2    4/2018
CN       110866528 A   *  3/2020 .......... G06F 18/214
WO    WO-2015077754 A1 *  5/2015 ............. G05B 15/02

OTHER PUBLICATIONS

Q. Chen et al., "Data-driven Task Allocation for Multi-task Transfer Learning on the Edge," 2019 IEEE 39th International Conference on Distributed Computing Systems (ICDCS), Dallas, TX, USA, pp. 1040-1050, doi: 10.1109/ICDCS.2019.00107. (Year: 2019).*

(Continued)

*Primary Examiner* — David Yi
*Assistant Examiner* — Nicholas Shine
(74) *Attorney, Agent, or Firm* — Finnegan, Henderson, Farabow, Garrett & Dunner, LLP (57) ABSTRACT

Conventionally, chiller power consumption has been optimized by using a Cooling Load based Control (CLC) approach which does not consider the impact of one control strategy on the other. Embodiments of the present disclosure provide reinforcement learning (RL) based control strategy to perform both chiller ON/OFF sequencing as well as setpoint leaving chilled water temperature (LCWT) scheduling. A RL agent is trained using a re-trained transfer learning (TL) model and LCWT, return chilled water temperature of target chillers and ambient temperature of building are read for determining required cooling load to be provided by target chiller(s) based on which the target chillers are scheduled for turning ON/OFF. Transfer learning-based approach is implemented by present disclosure to predict power consumed by a chiller at some setpoint by (Continued)

using a model trained on similar chillers which were operated at that setpoint since the chillers are usually run at a single setpoint.

6 Claims, 6 Drawing Sheets

(58) Field of Classification Search
CPC ........ G06N 3/091; G06N 3/092; G06N 3/094;
G06N 3/096; G06N 3/098; G06N 3/0985;
G06N 3/0464; G06N 3/0475; G06N
3/0495; G06N 3/0499; F25D 3/00; Y02B
70/3225; Y04S 20/222; G05B 13/0265;
H02J 3/14
See application file for complete search history.

(56) References Cited

U.S. PATENT DOCUMENTS

2018/0299840 A1* 10/2018 Sinha ................. G05B 13/0265
2019/0236446 A1* 8/2019 Qin ......................... G06N 3/10

OTHER PUBLICATIONS

Mathieu Bourdeau et al., "Modeling and forecasting building energy consumption: A review of data-driven techniques", Sustainable Cities and Society, vol. 48, 2019, 101533, ISSN 2210-6707, https://doi.org/10.1016/j.scs.2019.101533. (Year: 2019).*

Gao, et al., "A Artificial Intelligence-based Online Question and Application Method Thereof", English Translation of CN-110866528-A, Translated by PE2E (Year: 2025).*

Zheng et al., "Data driven chiller sequencing for reducing hvac electricity consumption in commercial buildings," in ACM e-Energy, https://dl.acm.org/doi/pdf/10.1145/3208903.3208913, (Year: 2018).*

Wei et al., "Deep Reinforcement Learning for Building HVAC Control," in Proceedings of the 54th Annual Design Automation Conference 2017, https://dl.acm.org/doi/10.1145/3061639.3062224, (Year: 2017).*

Wei et al., "Deep Reinforcement Learning for Building HVAC Control", ACM/EDAC/IEEE Design Automation Conference (DAC), IEEE, 6 pages, 2017 Link: https://ywang393.expressions.syr.edu/wp-content/uploads/2016/07/Deep-reinforcement-learning-for-HVAC-control-in-smart-buildings.pdf.

Gao et al., "Energy-Efficient Thermal Comfort Control in Smart Buildings via Deep Reinforcement Learning", Internet of Things Journal, Research Gate, IEEE, vol. 7, issue 9, pp. 1-11, 2019 Link: https://arxiv.org/pdf/1901.04693.pdf.

Ahn et al., "Application of deep Q-networks for model-free optimal control balancing between different HVAC systems", Science and Technology for the Built Environment, Taylor & Francis, Tandf online.com, Title page and pp. 61-74, 2019 Link: https://www.tandfonline.com/doi/pdf/10.1080/23744731.2019.1680234?needAccess=true.

Vu et al., "Data Driven Chiller Plant Energy Optimization with Domain Knowledge", Conference on Information and Knowledge Management, ACM, pp. 1-9, 2017 Link: https://arxiv.org/pdf/1812.00679.pdf.

* cited by examiner

MULTI-CHILLER SCHEDULING USING REINFORCEMENT LEARNING WITH TRANSFER LEARNING FOR POWER CONSUMPTION PREDICTION

PRIORITY CLAIM

This U.S. patent application claims priority under 35 U.S.C. § 119 to: India application No. 202021013671, filed on Mar. 28, 2020. The entire contents of the aforementioned application are incorporated herein by reference.

TECHNICAL FIELD

The disclosure herein generally relates to chiller scheduling and power consumption prediction techniques, and, more particularly, to multi-chiller scheduling using reinforcement learning with transfer learning for power consumption prediction.

BACKGROUND

A major part of the costs in running businesses goes towards energy consumption at the site where the business is operating. In order to achieve building energy efficiency, it is vital to have an efficient chiller sequencing strategy in a multiple-chiller plant scenario since chillers are a major contributor of power consumption in buildings. A commonly used strategy for optimizing chiller power consumption is Cooling Load based Control (CLC). There are number of studies in literature to optimize the chiller load distribution as well as the number of operating chillers. However, these do not mostly consider the impact of one control strategy on the other and even if they holistically control both, they fail to consider additional parameters such as modulating the chiller temperatures and the like.

SUMMARY

Embodiments of the present disclosure present technological improvements as solutions to one or more of the above-mentioned technical problems recognized by the inventors in conventional systems. For example, in one aspect, there is provided a processor implemented method for multi-chiller scheduling using reinforcement learning with transfer learning for power consumption prediction. The method comprises: obtaining, via one or more hardware processors, an input data comprising time series data pertaining (i) design parameters of a first set of chillers deployed in a building, (ii) a leaving chilled water temperature (LCWT) of each of the first set of chillers, and (iii) required cooling load provided by each of the first set of chillers collected for a pre-defined time-interval; training, via the one or more hardware processors, a pre-trained transfer learning (TL) model based on the input data to obtain a re-trained TL model; training, via the one or more hardware processors, a deep reinforcement learning (RL) agent using the re-trained TL model; reading, by the deep RL agent executed by the one or more hardware processors and deployed in the first set of target chillers, (i) a leaving chilled water temperature (LCWT), (ii) a returned chilled water temperature (RCWT) of each of the first set of chillers, and (iii) ambient temperature associated with the building; determining, via the one or more hardware processors, required cooling load to be provided by the first set of chillers, based on the LCWT and (ii) the RWCT of each of the first set of chillers; and scheduling, by the deep RL agent executed by the one or more hardware processors, (i) turning ON or turning OFF each of the first set of chillers and (ii) the LCWT for each of the first set of chillers based on (i) the required cooling load to be provided by the first set of chillers, and (ii) the ambient temperature associated with the building.

In an embodiment, the step of training, via the one or more hardware processors, a pre-trained transfer learning (TL) model based on the input data to obtain a re-trained TL model is preceded by training a transfer learning model based on (i) design parameters of a second set of chillers, (ii) LCWT of each of the second set of chillers, (iii) required cooling load provided by the second set of chillers to obtain the pre-trained TL model. The method further comprises upon scheduling at least one of turning ON and turning OFF (i) each of the first set of chillers and (ii) one or more LCWT for each of the first set of chillers, predicting, using the re-trained TL model, power consumption of each of the first set of chillers for a specified LCWT.

In an embodiment, during the training of the deep RL agent using the re-trained TL model, the deep RL agent calculates a reward function for each of the first set of chillers.

In an embodiment, the design parameters comprise maximum capacity that is satisfied by each of the first set of chillers and the second set of chillers, and a co-efficient of performance (COP) of each of the first set of chillers and the second set of chillers.

In another aspect, there is provided a system for multi-chiller scheduling using reinforcement learning with transfer learning for power consumption prediction. The system comprises a memory storing instructions; one or more communication interfaces; and one or more hardware processors coupled to the memory via the one or more communication interfaces, wherein the one or more hardware processors are configured by the instructions to: obtain an input data comprising time series data pertaining (i) design parameters of a first set of chillers deployed in a building, (ii) a leaving chilled water temperature (LCWT) of each of the first set of chillers, and (iii) required cooling load provided by each of the first set of chillers collected for a pre-defined time-interval; train a pre-trained transfer learning (TL) model based on the input data to obtain a re-trained TL model; train a deep RL agent using the re-trained TL model; read, using the deep RL agent executed by the one or more hardware processors, deployed in the first set of target chillers, (i) a leaving chilled water temperature (LCWT), (ii) a returned chilled water temperature (RCWT) of each of the first set of chillers, and (iii) ambient temperature associated with the building; determine, via the one or more hardware processors, required cooling load to be provided by the first set of chillers, based on the LCWT and (ii) the RWCT of each of the first set of chillers; and schedule, using the deep RL agent executed by the one or more hardware processors, (i) turning ON or turning OFF each of the first set of chillers and (ii) the LCWT for each of the first set of chillers based on (i) the required cooling load to be provided by the first set of chillers, and (ii) the ambient temperature associated with the building.

In an embodiment, the step of training, via the one or more hardware processors, a pre-trained transfer learning (TL) model based on the input data to obtain a re-trained TL model is preceded by training a transfer learning model based on (i) design parameters of a second set of chillers, (ii) LCWT of each of the second set of chillers, (iii) required cooling load provided by the second set of chillers to obtain the pre-trained TL model.

In an embodiment, upon scheduling at least one of turning ON and turning OFF (i) each of the first set of chillers and (ii) one or more LCWT for each of the first set of chillers, the re-trained TL model predicts power consumption of each of the first set of chillers for a specified LCWT.

In an embodiment, during the training of the deep RL agent using the re-trained TL model, the deep RL agent calculates a reward function for each of the first set of chillers.

In an embodiment, the design parameters comprise maximum capacity that is satisfied by each of the first set of chillers and the second set of chillers, and a co-efficient of performance (COP) of each of the first set of chillers and the second set of chillers.

In yet another aspect, there is provided a computer program product comprising a non-transitory computer readable medium having a computer readable program embodied therein, wherein the computer readable program, when executed on a computing device, causes the computing device to: schedule multi-chiller using reinforcement learning with transfer learning for power consumption prediction by: obtaining, via one or more hardware processors, an input data comprising time series data pertaining (i) design parameters of a first set of chillers deployed in a building, (ii) a leaving chilled water temperature (LCWT) of each of the first set of chillers, and (iii) required cooling load provided by each of the first set of chillers collected for a pre-defined time-interval; training, via the one or more hardware processors, a pre-trained transfer learning (TL) model based on the input data to obtain a re-trained TL model; training, via the one or more hardware processors, a deep RL agent using the re-trained TL model; reading, by the deep RL agent executed by the one or more hardware processors and deployed in the first set of target chillers, (i) a leaving chilled water temperature (LCWT), (ii) a returned chilled water temperature (RCWT) of each of the first set of chillers, and (iii) ambient temperature associated with the building; determining, via the one or more hardware processors, required cooling load to be provided by the first set of chillers, based on the LCWT and (ii) the RWCT of each of the first set of chillers; and scheduling, by the deep RL agent executed by the one or more hardware processors, (i) turning ON or turning OFF each of the first set of chillers and (ii) the LCWT for each of the first set of chillers based on (i) the required cooling load to be provided by the first set of chillers, and (ii) the ambient temperature associated with the building.

In an embodiment, the step of training, via the one or more hardware processors, a pre-trained transfer learning (TL) model based on the input data to obtain a re-trained TL model is preceded by training a transfer learning model based on (i) design parameters of a second set of chillers, (ii) LCWT of each of the second set of chillers, (iii) required cooling load provided by the second set of chillers to obtain the pre-trained TL model.

In an embodiment, upon scheduling at least one of turning ON and turning OFF (i) each of the first set of chillers and (ii) one or more LCWT for each of the first set of chillers, the re-trained TL model predicts power consumption of each of the first set of chillers for a specified LCWT.

In an embodiment, during the training of the deep RL agent using the re-trained TL model, the deep RL agent calculates a reward function for each of the first set of chillers.

In an embodiment, the design parameters comprise maximum capacity that is satisfied by each of the first set of chillers and the second set of chillers, and a co-efficient of performance (COP) of each of the first set of chillers and the second set of chillers.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Achieving building energy efficiency is an important goal for all businesses and commercial establishments. A major part of the costs in running businesses goes towards energy consumption at the site where the business is operating. Heating, Ventilating, Air Conditioning (HVAC) units contribute a major share of electricity consumption in commercial buildings and optimizing its operations could help achieve significant savings in power consumption and cost for the company. Many infrastructures (e.g., corporates) are seeking professional help continuously to reduce their monthly bills and the demand for power saving measures have mushroomed research in producing many novel chiller efficiency techniques. Consumers are looking for energy service companies to provide them with solutions to tackle this problem which are both environment friendly as well as cost-effective.

In order to achieve building energy efficiency, it is vital to have an efficient chiller sequencing strategy in a multiple-chiller plant scenario since chillers are a major contributor of power consumption in buildings. A commonly used strategy for optimizing chiller power consumption is Cooling Load based Control (CLC). There are a number of studies in literature to optimize the chiller load distribution and chiller operation. However, these do not consider the impact of one control strategy on the other and even if they holistically control both, they fail to consider additional power saving controls such as modulating the chiller leaving chilled water temperature (LCWT) (also referred as setpoint and interchangeably used hereinafter). In order to find the power savings that can be obtained when a chiller is run at a specific setpoint, a prediction model is required that can predict the power consumed by the chiller at that setpoint. However, building such a model requires data for different setpoints and in practice, a chiller is usually run at a single setpoint.

In a multiple-chiller plant scenario consisting of a mix of a number of air-cooled as well as water-cooled chillers, embodiments of the present disclosure provide systems and methods that implement reinforcement learning based control strategy to perform both chiller ON/OFF sequencing as well as LCWT scheduling subjected to additional operating constraints. To predict the power consumption of a chiller at different setpoints, a transfer learning based approach is implemented by the systems and methods of the present disclosure to predict the power consumed by a chiller at some setpoint by using the model trained on similar chillers which have been operated at that setpoint since chillers are usually run at a single setpoint.

The chillers in a multiple-chiller plant are always generally designed to meet the cooling load of the building if they are all operated together. However, in order to save power, it is recommended to operate only enough chillers that can serve the necessary cooling load requirements. Also, the chiller performance varies for different leaving chilled water setpoint values and so when an optimum value of the setpoint corresponding to the required cooling load is kept, it will result in more savings.

Below expressions/equations describe a chiller scheduling problem. For a given multi-chiller plant consisting of 'n' chillers, at any time 't', the objective is to turn ON 'm' number of chillers, m≤n such that the minimum cooling load requirement at time 't' ($Q_t$) is met which can be stated through the equations (1) through (6). The objective of minimizing the cooling load is stated in (2) and the main constraint of satisfying the cooling load requirement at any time is denoted in (6). $c_t(i)$ denotes the ON/OFF state of chiller t denoted by binary 1/0 (refer equation (3)) and hence the sum across all the chillers equals to 'm' as in equation (1). $P_t(i)$ denotes the sum of pump and chiller power consumed by chiller i at time t which is a function of the chiller load and the chilled water setpoint at that time t as denoted in equation (4). $PLR_t$ denotes the Part Load Ratio of each chiller at time t. $Q_{cap}(i)$ denotes the maximum cooling capacity of chiller i. $Tchwl_t(i)$ denotes the leaving chilled liquid temperature setpoint of the chillers at time t. The discrete values taken for the setpoint are denoted in equation (5). $PLR_t$ is calculated as in equation (7). The cooling load at any time t, $Q_t$, can be calculated from the chilled water leaving temperature ($Tchwl_t$), return chilled water temperature ($Tchwr_t$) and mass flow rate ($m_t$) as in equation (8) where $c_p$ is the specific heat of chilled water.

$$\Sigma_{i=1}^{n} c_t(i)=m \quad (1)$$

$$\min \Sigma_{i=0}^{i=n} c_t(i)P_t(i) \quad (2)$$

$$c_t(i) \in \{0,1\} \quad (3)$$

$$P_t(i)=f(PLR_t, Qcap(i), Tchwl_t) \quad (4)$$

$$Tchwl_t \in \{5,6,7,8,9\}° C. \quad (5)$$

$Q_{cap}(i)$ denotes the maximum cooling capacity of chiller i. $Tchwl_t(i)$ denotes the leaving chilled liquid temperature setpoint of the chillers at time t, such that $$\Sigma_m PLR_t Q_{cap}(i) \geq Q_t \quad (6)$$

where $PLR_t$ is calculated as follows, $$PLR_t = \frac{Q_t}{\sum_m c_t(i)Qcap(i)} \quad (7)$$

The cooling load at any time t, $Q_t$, can be calculated from the chilled water leaving temperature ($Tchwl_t$), return chilled water temperature ($Tchwr_t$) and mass flow rate ($m_t$) as follows, $$Q_t = \dot{m}_t c_p (Tchwr_t - Tchwl_t) \quad (8).$$

Additional constraints to be satisfied can be stated as follows:

1. The chiller has to be kept ON for a minimum period corresponding to 'a' timestamps before switching OFF, which is expressed in below non-construing equation (9):

if $c_t(i)=0, c_{t-1}(i)=0$ (or) $\Sigma_{j=1}^{a} c_{t-j}(i)=a \forall i,t \quad (9)$ 2. The chiller has to be kept OFF for a minimum period corresponding to 'b' timestamps before switching ON, which is expressed in below non-construing equation (10):

if $c_t(i)=1, c_{t-1}(i)=1$ (or) $\Sigma_{j=1}^{b} c_{t-j}(i)=0 \forall i,t \quad (10)$ 3. The chiller can be turned ON only when it is available at that time which is denoted by $\hat{c}_t$ which is expressed in below non-construing equation (11):

if $c_t(i)=1, \hat{c}_t(i)=1 \forall i,t \quad (11)$

4. The chiller needs to be ON for at least T' timestamps in a considered period T (such as a year), which is expressed in below non-construing equation (12):

$\Sigma_{t=1}^{T} c_t(i) \geq T' \forall i \quad (12)$

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 1:
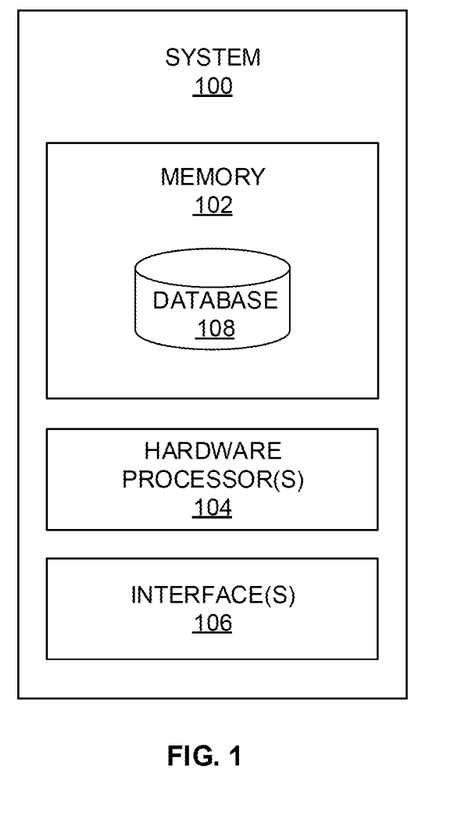
FIG. 1 depicts a system for multi-chiller scheduling using reinforcement learning with transfer learning for power consumption prediction, in accordance with an embodiment of the present disclosure.

FIG. 1 depicts a system 100 for multi-chiller scheduling using reinforcement learning with transfer learning for power consumption prediction, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, various design parameters of chillers, information pertaining to leaving chilled water temperature (LCWT) of each of the chillers, and required cooling load provided by each of the chillers collected for a pre-defined time-interval, and the like. The design parameters comprise maximum capacity that is satisfied by each of the chillers, and a co-efficient of performance (COP) of each of the chillers. The information stored in the database 108 may further comprise (i) a leaving chilled water temperature (LCWT), (ii) a returned chilled water temperature (RCWT) of each of the first set of chillers, and (iii) ambient temperature associated with the building, read by a reinforcement learning (RL) agent when deployed in the chillers, and the like.

In an embodiment, the memory 102 may store (or stores) one or more techniques. For instance, the RL agent and a transfer learning (TL) model, and the like may be comprised in the memory 102 and executed accordingly to perform one or more methodologies described hereinafter. Further the memory 102 may comprise training information of the RL agent and TL model. The memory 102 further stores information on power consumption of each of the chillers that is predicted by the TL model. The memory 102 further stores reward function calculated for each of the chillers based on their performance.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
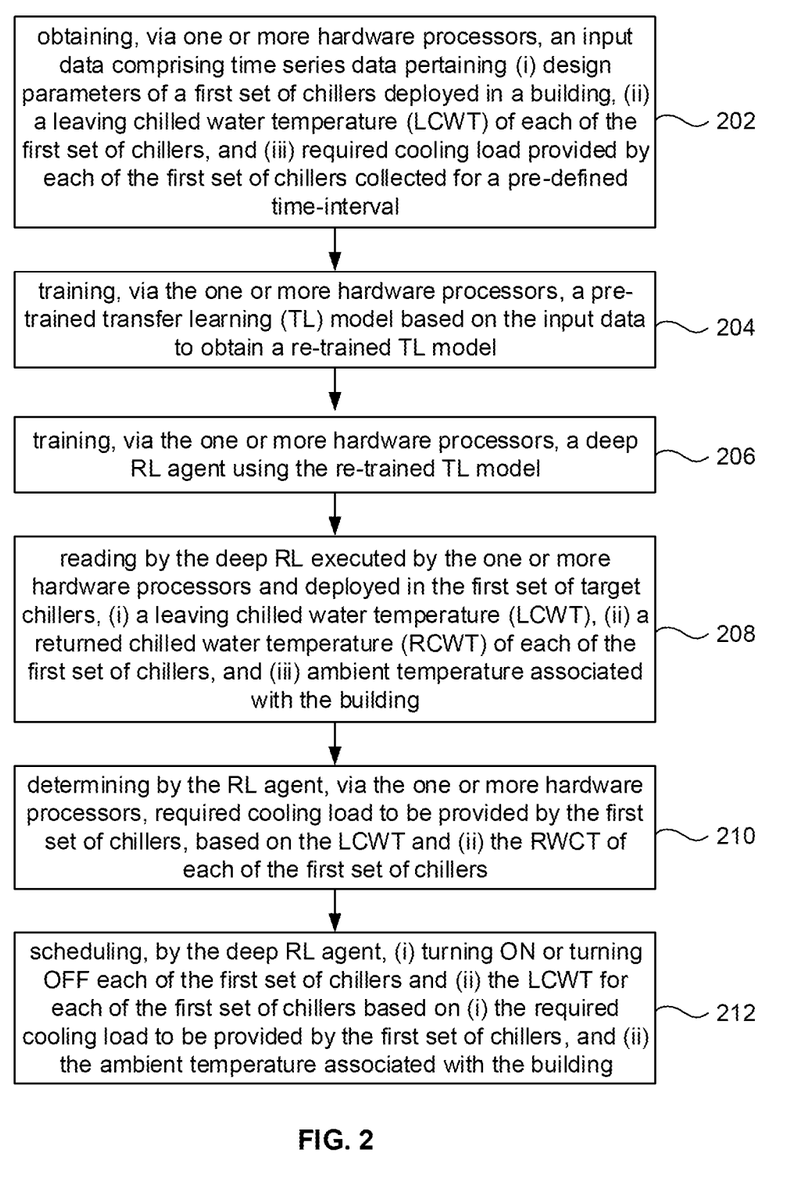
FIG. 2 depicts an exemplary flow chart illustrating a multi-chiller scheduling using reinforcement learning with transfer learning for power consumption prediction using system of FIG. 1, in accordance with an embodiment of the present disclosure.

FIG. 2, with reference to FIG. 1, depicts an exemplary flow chart illustrating a multi-chiller scheduling using reinforcement learning with transfer learning for power consumption prediction using system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2 and block diagrams of FIGS. 3-6. In an embodiment, at step 202 of the present disclosure, the one or more hardware processors 104 obtain an input data comprising time series data pertaining (i) design parameters of a first set of chillers, wherein the first set of chillers are deployed in a building (or a location/infrastructure), (ii) a leaving chilled water temperature (LCWT) of each of the first set of chillers, and (iii) required cooling load provided (or serviced) by each of the first set of chillers collected for a pre-defined time-interval. The pre-defined time-interval is, for example, say 1 year, in an embodiment of the present disclosure and this example of time-interval shall not be construed as limiting the scope of the present disclosure. The expression 'required cooling load provided' (or serviced) by each of the first set of chillers refers to cooling load (amount of cooling) provided by each of the first set of chillers when deployed in the building and being operated.

In an embodiment, at step 204 of the present disclosure, the one or more hardware processors 104 train a pre-trained transfer learning (TL) model based on the input data to obtain a re-trained TL model. The TL model is trained at a first level based on (i) design parameters of a second set of chillers (which could be deployed in the same building or another building), (ii) LCWT of each of the second set of chillers, and (iii) required cooling load provided by the second set of chillers to obtain the pre-trained TL model. The expression 'required cooling load provided' (or serviced) by each of the second set of chillers refers to cooling load (amount of cooling) provided by each of the second set of chillers when deployed in the building (e.g., same building or another building) and being operated. At a second level, the trained TL model (also referred as pre-trained TL model and interchangeably used herein after) is once again trained using the input data obtained at step 202. The above step 204 and training of the TL model at the first level and the second level is better understood by way of following description.

The relationship of chillers' power with respect to cooling load and leaving chilled water temperature is learned by training an artificial neural network (comprised in the memory 102 of the system 100) using actual chiller power consumption data. Since the chillers are usually run at a single setpoint in practice, it is difficult to train a model (e.g., neural network model/artificial neural network) that learns the relationship for multiple setpoints. Hence, in the transfer learning technique, a dataset consisting of a pool of chillers (e.g., second set of chillers) with different capacities are considered where chiller is run at some single setpoint. For each chiller, the values of the power consumed for a given setpoint, cooling load and entering condenser water temperature are available and the entering condenser water temperature is assumed to be a single constant value. This transfer learning basically has two steps: (i) storing the knowledge gained from a problem and (ii) reusing this knowledge for a different problem which is related to the previous one. Neural network model developed in the first step is usually called a base model and this base model is retrained in the second step to suit problem to be solved.

In the chiller power prediction problem, the base model is trained to predict the power consumed by a selected group of chillers using the data of those chillers from the dataset. This set of chillers is chosen using K-Means clustering algorithm as known in the art, clustered using the design power of each of the chillers. This base model is retrained for the target chiller for which the power consumption values are required for a different setpoint other than the one at which it had been run using the data available. In other words, the re-trained TL model predicts power consumption of each of the first set of chillers for a given/specified LCWT. It is to be understood by person having ordinary skill in the art and person skilled in the art that data available is only for a single setpoint and the closer the setpoint is to the new setpoint, the better is the prediction accuracy. The base model is retrained using the concept of 'Differential Learning Rates' as known in the art. Here, the layers in the neural network are divided into groups-initial layers, layers in the middle and final layers. The same learning rate has been used for each layer in a group and each group is given a different learning rate. However, for many cases, the layers in the middle and the final layers use the same learning rates. The values of the learning rates decrease as there is a progression from the group of initial layers to the group of final layers. The retrained model can give the power consumption values of the target chiller for the new setpoint.

Referring to steps of FIG. 2, at step 206 of the present disclosure, the one or more hardware processors 100 train a deep RL agent using the re-trained TL model. At step 208 of the present disclosure, the deep RL agent deployed in the first set of target chillers, reads (i) a leaving chilled water temperature (LCWT), (ii) a returned chilled water temperature (RCWT) of each of the first set of chillers, and (iii) ambient temperature associated with the building. In an embodiment of the present disclosure, at step 210, the deep RL agent executed by the hardware processors 104 determines required cooling load to be provided by the first set of chillers, based on the LCWT and (ii) the RWCT of each of the first set of chillers. In an embodiment of the present disclosure, at step 212, the deep RL agent executed by the hardware processors 104 schedules (i) turning ON or turning OFF each of the first set of chillers and (ii) the LCWT for each of the first set of chillers based on (i) the required cooling load to be provided by the first set of chillers, and (ii) the ambient temperature associated with the building.

The above steps 206 till 212 are better understood by way of following description. In order to formulate a scheduling problem as an RL problem, state space, action space and reward function have to be designed. The binary ON/OFF state of each of the chillers (e.g., first set of chillers) along with the current cooling load requirement and the current ambient temperature are taken and represented as a state and the action is a discrete set of possible combinations of turning each chiller ON/OFF along with the discrete set of setpoint values. To satisfy additional operating constraints, past chiller states as well as binary availability status of each of the chillers also need to be encoded in state representation. The RL agent updates the action value function approximator in order to maximize total reward in an episode and so the reward function is formulated as follows: A negative reward is assigned if the RL agent takes an action which results in the cooling load not being met. A positive normalized reward in some nominal range is assigned for the other actions proportional to the difference between the maximum power consumption and the power consumption corresponding to the action. This power consumption is the sum of chiller and pump power. The maximum power consumption is an estimated power consumption value when all chillers are operating at full load at a very poor setpoint. A negative reward is also assigned when the minimum ON period, minimum OFF period and chiller availability constraints are not met. The epoch duration is varied and fixed according to the minimum ON counts (T') per period (T) constraint and a negative reward at the terminal state is assigned corresponding to the number of chillers not satisfying this constraint. The reward function is calculated by the RL agent during its training using the re-trained TL model.

The objective of intelligently scheduling the chillers is met such that they minimize the power consumption ensuring the cooling load requirement and the constraints are met at any time. Since the state space is huge with a mix of discrete and continuous valued states, the action space is discrete and thus Deep Q-Network algorithm, as known in the art, can be used to train the RL agent. An epsilon-decay exploration strategy is used by the systems and methods of the present disclosure to carry out enough exploration. During training, the RL environment receives the action taken by the RL agent at each step and computes the step reward for taking that decision using the reward function and making use of power prediction model. The immediate reward, the transitioned next state and a Boolean to indicate whether the state is terminal or not denoted as 'done' are sent to the RL agent which performs the local q-value function approximator model update step. A separate target model identical to the local model is used to obtain supervised learning target for update step in order to overcome moving target problem and the target model is updated with a specific frequency. The RL agent also stores the state, action, reward, next state and done information in an experience replay buffer of a fixed maximum capacity. A fixed size mini batch of samples are chosen from the buffer for the RL update step. Once the RL agent is trained for a sufficient number of episodes, the trained RL agent can be used to schedule the ON/OFF states as well as the chilled water setpoint in real-time taking the sensor readings of ambient temperature, leaving chilled water temperature, return chilled water temperature and mass flow rates. The latter 3 readings can be used to calculate the cooling load.

The above elaborated text can be further better understood by way of following steps that are implemented in practice by the systems and methods of the present disclosure:
1. Building a power prediction model: In order to implement embodiments of the present disclosure, an accurate prediction model is built using Artificial Neural Network(s) (also referred as 'ANN' and interchangeably used hereinafter) where the tonnage and leaving chilled water temperature are taken as features to predict power consumption of target chiller(s). Present disclosure performed two approaches, namely:
    a. Direct: To train a neural network model, past consumption data is collected from the Building Management System (BMS) logs. The power consumption readings of each chiller are collected for a sufficient period of time. This trained model can be used to predict the power consumption for a given cooling load requirement at a specific setpoint if the chiller had been run at multiple setpoint values.
    b. Using transfer learning: However, since practically most of the chillers would have been run at a single setpoint, a transfer learning technique is implemented by the present disclosure and its systems and methods wherein chillers that are similar to the target chiller(s) are used to train the base model (first level TL model) which is then retrained (second level training of the trained TL model) on the target chiller to predict for the required setpoint. So, past consumption data for multiple chillers that had been run individually at different chilled water temperature setpoints at different sites are collected. This technique can be applied to develop models to predict power for each of the considered set of setpoint values.

i. Choosing similar chillers: Similar chillers are chosen using a clustering algorithm (e.g., K-means clustering algorithm and such clustering technique shall not be construed as limiting the scope of the present disclosure). The details of the design power of each chiller are taken and these values are clustered using K-means clustering. The number of clusters is chosen such that each cluster has at least 6-8 chillers. The other chillers present in the same cluster as that of the target chillers are chosen to train the base model.
  ii. Developing the base model: All these chosen chillers had been run at the same considered setpoint at which the target chiller(s) is/are to be run, and power consumption prediction is to be made. The base model is trained to predict the power consumed by a chiller in this set of chillers and uses the setpoint, cooling load, design capacity and design COP as the input features. The weights of this model are stored for retraining.
  iii. Retraining the TL model for the target chiller: The model weights saved in the previous case are loaded and used as the initial weights. The data available for the target chiller is used to retrain this network (TL model) using the concept of differential learning rates as known in the art.

2. Training an RL Agent to make good scheduling decisions: Available past consumption time-series data is repeated to generate a long training data for a sufficient period to train the reinforcement learning (RL) agent using Deep Q-Network algorithm (e.g., an algorithm as known in the art). An 'epoch' length is identified to split the whole training data into several 'episodes' for the RL agent. The epoch period could be 2 weeks, 1 month, 2 months, etc. and such time period shall not be construed as limiting the scope of the present disclosure. The generated train data period is usually 50/100 years. The hyper-parameters for the Deep Q-Network (DQN) algorithm apart from the number of steps (train/training data) such as Q-function approximator model architectural components, discount factor ($\gamma$), batch size for model update (S), target model update frequency, experience replay buffer length (B), $\varepsilon$-decay fraction and the like need to be tuned. The function approximator model hyper-parameters are the number of layers, number of neurons in each layer, learning rate ($\alpha$), optimizer algorithm and its related parameters (such as exponential weighted average moving average ($\rho$) and the numerical stability factor ($\varepsilon$) for RMSProp optimization algorithm, wherein RMSProp optimization algorithm is gradient-based optimization technique for optimizing a neural network). An RL agent (comprised in the memory 102 or to be deployed in the target chillers) is trained using a designed reward function making use of the power prediction model for the sufficient number of episodes during training. The learned RL agent (e.g., trained RL agent) can suggest the chiller ON/OFF sequence as well a LCWT setpoint from the given chiller state and cooling load requirement.

3. Deploying the trained model/agent: The trained RL model/agent can be deployed in the actual multi-chiller plant site. Once integrated into the BMS, the RL agent can be used in real-time to control each of the chillers in the multi-chiller plant at specific time intervals making use of the sensor readings to obtain the ambient temperature and cooling load apart from the chiller states.

Figure 3:
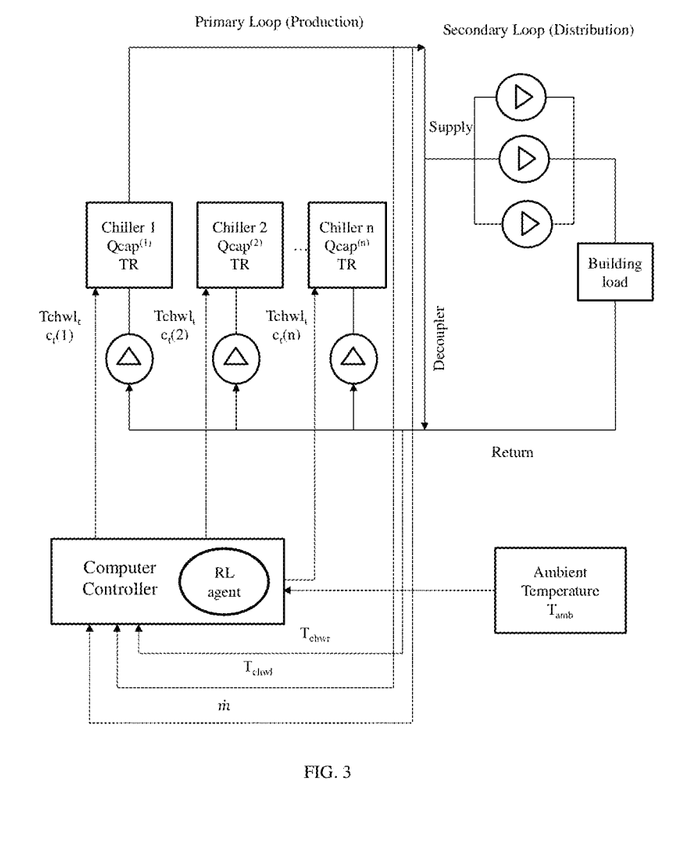
FIG. 3 depicts a block diagram of Multi-Chiller Plant that is controlled for scheduling chillers using a trained RL agent of the system of FIG. 1, in accordance with an embodiment of the present disclosure.

FIG. 3, with reference to FIGS. 1-2, depicts a block diagram of Multi-Chiller Plant that is controlled for scheduling chillers using a trained RL agent of the system 100 of FIG. 1, in accordance with an embodiment of the present disclosure. More specifically, FIG. 3 depicts a multi-chiller plant with primary and secondary chilled water loops with an addition of a trained RL agent controlling each chiller's ON/OFF operation and setpoint at each time t after reading meter values. The primary loop contains chiller bank with 'n' chillers (both air-cooled and water-cooled) each connected with a pump. The secondary loop contains secondary pumps and building load. A computer controller controls the chiller operation by reading real-time return and leaving chilled water temperatures (RCWT and LCWT respectively) and the flow rates of each of the chillers and calculates the cooling load requirement. It also uses the ambient temperatures which are used for power estimation of air-cooled chillers. The system 100 of the present disclosure can be either externally connected to the target chillers (e.g., the first set of chillers) or may be part of a building management system (BMS) wherein the system 100 uses actual chiller parameter readings to model RL agent's environment and the RL agent acts as the controller which is integrated into the BMS.

Figure 4:
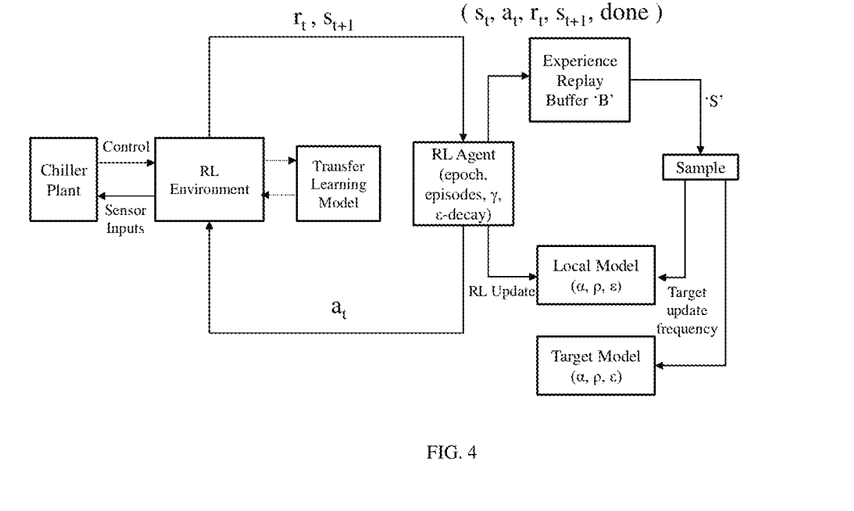
FIG. 4 depicts a block diagram of a Deep Q-Network based control flow as implemented by the system of FIG. 1, in accordance with an embodiment of the present disclosure.

FIG. 4, with reference to FIGS. 1 through 3, depicts a block diagram of a Deep Q-Network based control flow as implemented by the system 100 of FIG. 1, in accordance with an embodiment of the present disclosure. Controller (or hardware processor 104 of the system 100) has an RL agent trained using an algorithm such as DQN. The goal of the RL agent is to learn an optimal policy which helps the RL agent choose an optimal action (chiller ON/OFF sequencing and setpoint) at any given state in order to maximize the total expected reward in an episode. Chiller plant measurements are used to model the RL agent's environment. The transfer learning technique is used to obtain the power prediction for the target chiller for a given cooling load and setpoint by training a base model on similar chillers. This is used during the training phase. At any given state $s_t$, the RL agent takes an action at and the environment calculates the reward, $r_t$ for taking that action which leads to the next state $s_{t+1}$. The RL agent is trained using an algorithm such as DQN. It uses an experience replay buffer of size 'B' which stores the state, action, reward, next state and a Boolean to indicate whether the state is a terminal state or not at each time t as mentioned in the above sections of the detailed description provided in the present disclosure. There are two multilayer perceptron (MLP) neural network models for q-value function approximation, the local and target model. $\varepsilon$-decay exploration strategy is used in the RL agent's learning. The discount factor ($\gamma$), epoch length and total number of episodes are tuned to learn the optimal policy. As mentioned above, during training, a mini batch of size 'S' is sampled from the replay buffer and the target is calculated for the RL update step using the target model for each of the samples. Using the obtained target, the local model is updated at every update step. The target model is updated after a certain number of steps and this frequency is also selected by tuning. The model architecture, learning rate ($\alpha$), exponential weighted average moving average ($\rho$) and the numerical stability factor ($\varepsilon$) of RMSProp optimizer are tuned to obtain the best results.

Figure 5:
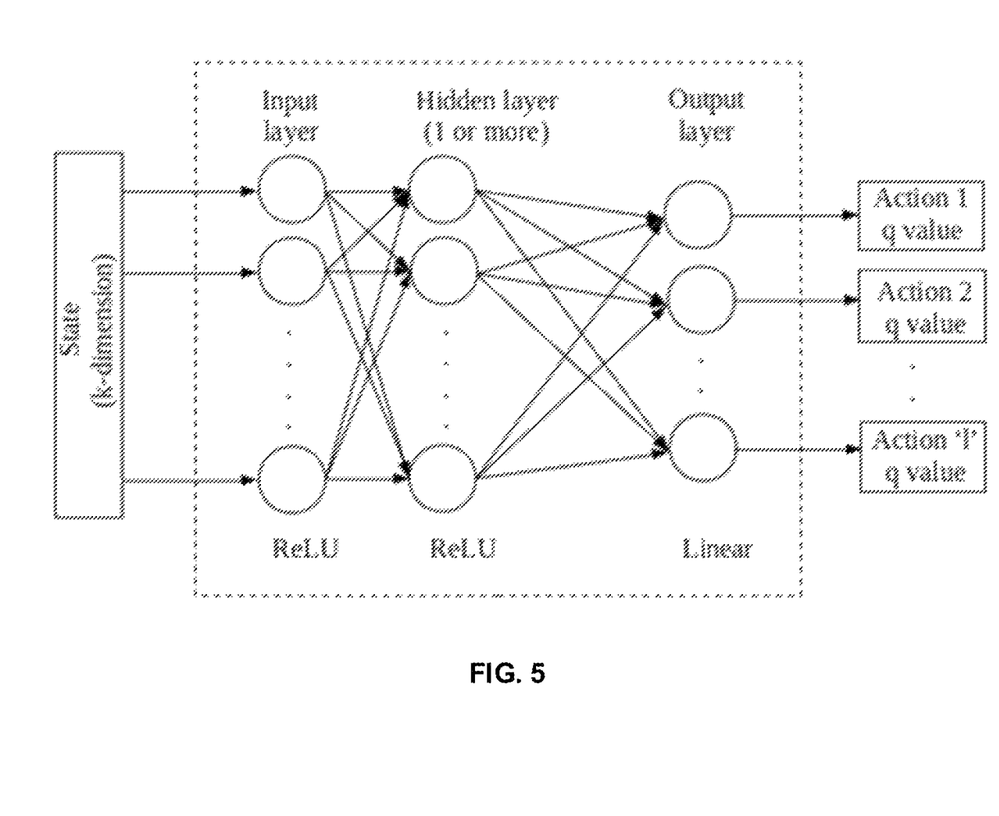
FIG. 5 depicts a Deep Q-Network model architecture as implemented by the system of FIG. 1, in accordance with an embodiment of the present disclosure.

FIG. 5, with reference to FIGS. 1 through 4, depicts a Deep Q-Network model architecture as implemented by the system 100 of FIG. 1, in accordance with an embodiment of the present disclosure. More specifically, FIG. 5 represents a Multi-Layer Perceptron model used as the q-value function approximator in the DQN algorithm. The input state is k-dimensional where 'k' depends on number of chillers (n) and additional constraint requirements while output has 'l' discrete actions where $l=2^{n}*$number of discrete LCWT setpoints. The number of hidden layers and the number of nodes in the hidden layers are chosen by tuning. ReLU (rectified linear unit) activation function is used for the hidden layers while linear activation function is used for the output later. Xavier initialization is used to initialize weights of the neural network. RMSProp optimization algorithm is used to train the RL agent.

Figure 6:
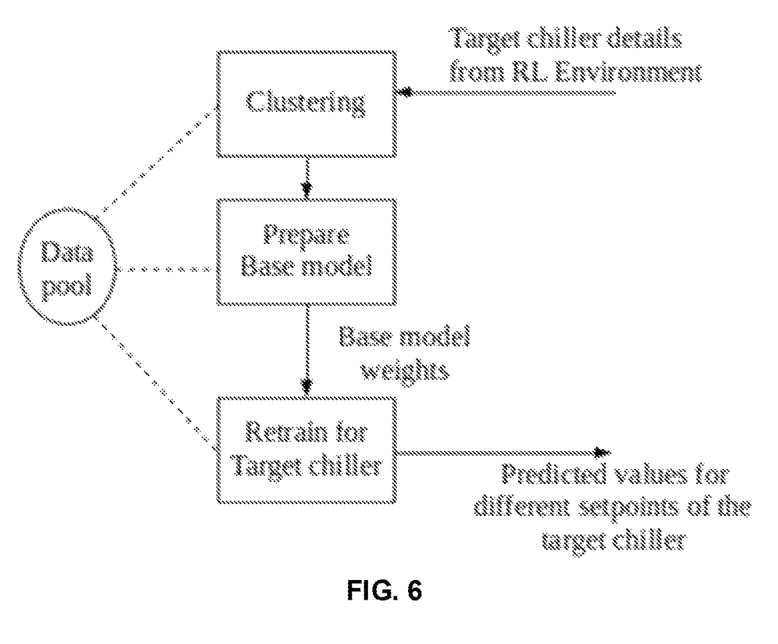
FIG. 6 depicts a transfer learning (TL) model workflow as implemented by the system of FIG. 1, in accordance with an embodiment of the present disclosure.

FIG. 6, with reference to FIGS. 1 through 5, depicts a transfer learning (TL) model workflow as implemented by the system 100 of FIG. 1, in accordance with an embodiment of the present disclosure. More specifically, FIG. 6 depicts procedural steps in the transfer learning technique that is used to predict the power consumption of a target chiller after retraining a base model (also referred as re-trained TL model post retraining the base model) built using the data of similar chillers. As mentioned above, dataset consisting of a pool of chillers with different capacities are considered where chiller(s) is/are run at some single setpoint. From this, the set of similar chillers is chosen using K-means clustering algorithm, clustered using the target chiller details such as design power. For each chiller, the values of the power consumed for a given setpoint, cooling load and entering condenser water temperature are available and the entering condenser water temperature is assumed to be a single constant value. A base model is prepared by training a neural network model using the similar chillers data to predict power. This base model is retrained for the target chiller and the output of this retraining results in a re-trained TL model wherein the retrained TL model predicts power consumption of target chillers for a different setpoint other than the one at which it had been run using the data available.

Experimental Results

Following is an example case of a heterogeneous chiller-plant of a HVAC unit serving a location (one or more buildings). Considering the Leaving Chilled Water Temperature (LCWT) values within {5° C., 6° C., 7° C., 8° C., 9° C.}. Considering building(s) with cooling load requirements in the range of 0 kW-27,500 KW (say mean value of 11,500 KW). Considering a chiller-plant comprising 6 water-cooled chillers and 4 air-cooled chillers with design parameters as follows:
1. 3 water-cooled chillers with: Cooling Capacity—3600 KW, COP—5, Flow Rate—0.113, Pump kW—90 KW, and entering Condenser Water Temperature—29.4° C.
2. 3 water-cooled chillers with: Cooling Capacity—3200 KW, COP—5.5, Flow Rate—0.113, Pump kW—90 KW and entering Condenser Water Temperature—29.4° C.
3. 4 air-cooled chillers with: Cooling Capacity—2200 kW, COP—4.5, Flow Rate—0.113, Pump kW—90 kW, and entering Condenser Air Temperature-Ambient Temperature (weather parameter, varies from place to place).

It is to be understood by a person having ordinary skill in the art or person skilled in the art that there could be more design parameters apart from flow rate and pump power (KW). However, the present disclosure has considered only the above-mentioned design parameters for simplicity and for better understanding of method provided by way of embodiments of the present disclosure.

Initial Data Collection:

Time-series historical data of required cooling load (calculated using the leaving chilled water temperature (LCWT) and return chilled water temperature values (RCWT)), LCWT, ambient temperature and corresponding power consumption (sum of chiller power and pump power) values of each of the chillers are collected. This input data collected is used to build a power prediction model using required cooling load, leaving chilled water temperature and ambient temperature (for air-cooled chillers) as features and the power as the target variable.

Since the LCWT values may not have significant variance in practise if the chillers had always been run at a constant setpoint, then the power prediction model may not accurately represent the relationship between the LCWT and power for the range of LCWT values considered. Hence, present disclosure implemented TL model and its training at the first level and the second level as described herein to obtain an accurate power prediction model.

Training Transfer Learning Models:

For each chiller with a different <Cooling Capacity, COP> value, a Transfer Learning model is built as follows: Consider the water-cooled chiller (say chiller 1) with the following specifications: Cooling Capacity—3600 KW and COP—5. Using these design parameters, other chillers which are like the one in consideration are found. The selected chillers have similar (Cooling Capacity/COP) values, which is nothing but the input power. The cooling capacity or COP values alone may not be the same. A neural network model (or the pre-trained TL model) is trained for these chillers to predict power consumption using LCWT, required cooling load, cooling capacity and COP as input features.

Since in this example, there are 3 unique chiller designs (water-cooled chillers of capacity 2600 KW and reference COP 5, water-cooled chillers of capacity 3200 KW and reference COP 5.5 and air-cooled chillers of capacity 2200 KW and reference COP 4.5), 3 different neural network models are trained.

The trained neural network model for each chiller (based on its design) is then retrained using the LCWT, required cooling load, cooling capacity and COP data of each of the target chillers to give the final TL models for each chillers which be used by the RL agent. So, 10 re-trained TL models, one for each individual chiller in the example being considered.

Training an RL Agent Using the TL Power Prediction Models:

Each chiller ON/OFF state is represented using binary 1/0 respectively. DQN is used to train a RL agent using the previous chiller ON/OFF state of each of the chillers, required cooling load, ambient temperature and any other previous chiller states (depending on the constraints defined) to take decisions on the chiller ON/OFF state and the LCWT at the current step/time. The TL models are used in the function that calculates a reward at each step for an action that the RL agent takes during the learning period. Once the learning is over, this RL agent would have learnt an optimal policy that enables it to take optimal decisions in real-time after deployment.

Considering at some step or time t, the previous step chiller state is [1, 1, 0, 1, 1, 0, 0, 0, 0, 1] (ON/OFF state corresponding to chiller 1, . . . , chiller 10) and the required cooling load is 10200 kW and the ambient temperature is 23° C. It is further assumed that there are no operational constraints, for simplicity. The RL agent after training could suggest an action after learning an optimal policy. Say, it suggested an action as chiller state: [1, 1, 0, 1, 0, 0, 0, 0, 0, 0], LCWT: 7° C. In another scenario, it suggested an action as chiller state: [1, 0, 0, 1, 1, 1, 0, 0, 0, 0], LCWT: 8° C. There can be many such actions, but the suggested action is based on the learnt policy which minimizes total chiller power consumption (both example actions mentioned satisfy the cooling load, but the power consumption varies).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As mentioned above, conventional systems present design-based model of the various components of a chiller and HVAC unit. Such models fail to capture (or lacking in capturing) the actual real-time performance of the multi-chiller plant system and may not be applicable in practice. Embodiments of the present disclosure propose a control strategy using reinforcement learning agent that is trained using power prediction models developed on actual meter reading datasets. The reinforcement learning agent as implemented by the present disclosure captures the effect of operating each of the chillers more precisely at different conditions when a proper exploration strategy is used that helps the RL agent understand the RL environment dynamics more clearly. The optimal control strategies conceived in conventional systems and methods take decisions at every step based on the conditions prevailing at that time-step and they do not consider additional operational and user-preference based constraints. In the present disclosure, systems and methods provide RL based solution that helps in specifying additional constraints to the chiller scheduling problem. The RL agent makes decisions at every step to maximize expected future rewards and this approach therefore helps in scheduling the chillers considering the futuristic states as well. The control strategy as described herein would take a non-optimal immediate decision in order to avoid failing some important constraints in the next steps. It would also take an optimal action that achieves the maximum reward even when the constraints are not mutually exclusive.

Therefore, conventional systems and methods revolve around improvements to cooling load-based control strategy for chiller sequencing or usage of optimization algorithms for efficient chiller load distribution. These conventional approaches only optimize the schedule for a given time without considering its implications in future. Embodiments of the present disclosure and its systems and methods provide a problem formulation to use reinforcement learning for optimal control to perform chiller ON/OFF sequencing as well as chilled water set-point scheduling at a given state in time considering the possible future states. The system and method of the present disclosure also handle the operational and user-specified constraints and is flexible, adaptable and applicable in practice. If the dataset is unavailable, it would be challenging and would not be possible to build a power prediction model for a chiller to make predictions for various set-points (as is in the existing approaches where the dataset is unavailable). The transfer learning technique as described herein by the present disclosure solves this issue for chillers generally run a single set-point (also referred as leaving chiller water temperature).

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for scheduling a multi-chiller, in a multi-chiller plant in a building, using reinforcement learning with transfer learning for power consumption prediction, the processor implemented method comprising:

obtaining, by one or more hardware processors, an input data comprising time series data pertaining (i) design parameters of a first set of chillers deployed in the building, (ii) a leaving chilled water temperature (LCWT) of each chiller of the first set of chillers, and (iii) a required cooling load provided by each chiller of the first set of chillers collected for a pre-defined time-interval;

training, by the one or more hardware processors, a transfer learning (TL) model based on (i) design parameters of a second set of chillers with different capacities, each chiller of the second set of chillers being run at a single set point (ii) a LCWT of each chiller of the second set of chillers, (iii) a required cooling load provided by each chiller of the second set of chillers, to obtain a pre-trained TL model, wherein the second set of chillers are similar to the first set of chillers, the second set of chillers being chosen using K-means clustering algorithm;

training, by the one or more hardware processors, the pre-trained TL model based on the input data to obtain a re-trained TL model with learning of a relationship of the chiller's power with respect to the LCWT of each chiller of the second set of chillers and the required cooling load of each chiller of the second set of chillers, wherein the re-trained TL model comprises a plurality of layers divided into groups comprising initial layers, layers in middle, and final layers, wherein a same learning rate is used for each layer in a group and each group is given a different learning rate, wherein values of learning rates decrease as there is a progression from the initial layers to the final layers, and wherein the re-trained TL model is used for predicting power consumed by each of the first set of chillers for a specified LCWT and for at least one new set point;

training, by the one or more hardware processors, a deep reinforcement learning (RL) agent using the re-trained TL model, wherein during the training of the deep RL agent using the re-trained TL model, the deep RL agent determines a reward function for each chiller of the first set of chillers and the determined reward function is used for training the deep RL agent, wherein determining the reward function comprises:

assigning a negative reward based on at least one of: if the deep RL agent takes an action which results in the required cooling load not being met, and when minimum ON period constraint, minimum OFF period constraint, and chiller availability constraint are not met, and assigning a positive reward in a nominal range if the deep RL agent takes other actions proportional to difference between a maximum power consumption and power consumption corresponding to the action, wherein training the deep RL agent using the re-trained TL model comprises:

generating training data for a specific period to train the deep RL agent using a Deep Q-Network algorithm;

identifying an 'epoch' length to split the training data into a plurality of episodes, wherein the 'epoch' length is varied or fixed according to the minimum ON period constraint; and training the deep RL agent using the reward function for a specific number of episodes of the plurality of episodes for scheduling an ON state or an OFF state of each chiller of the first set of chillers and a chilled water set point of each chiller of the first set of chillers using sensor readings obtained in real-time including an ambient temperature associated with the building, the LCWT of each chiller of the first set of chillers, a returned chilled water temperature (RCWT) of each chiller of the first set of chillers, and mass flow rates of each chiller of the first set of chillers, and wherein the deep RL agent is trained using the re-trained TL model to capture the effect of operating each chiller of the first set of chillers at different conditions using an exploration strategy based on an epsilon-decay exploration; and deploying, by the one or more hardware processors, the trained deep RL agent in a Building Management System (BMS) of the building, wherein the trained deep RL agent controls each chiller of the first set of chillers in real-time by:

reading, (i) the LCWT of each chiller of the first set of chillers, (ii) the RCWT of each chiller of the first set of chillers, (iii) the ambient temperature associated with the building, and (iv) the mass flow rates of each chiller of the first set of chillers;

determining a required cooling load to be provided by the first set of chillers is calculated from the chilled water leaving temperature ($Tchwl_t$), return chilled water temperature ($Tchwr_t$) and mass flow rate ($m_t$) as $Q_t = \dot{m}_t c_p (Tchwr_t - Tchwl_t)$, where $c_p$ is a specific heat of chilled water, wherein minimizing the required cooling load is stated as min $\Sigma_{i=0}^{i=n} c_t(i) P_t(i)$, where $c_t(i)$ denotes ON/OFF state of chiller denoted by binary 1 or 0, $P_t(i) = f(PLR_t, Qcap(i), Tchwl_t)$, where $P_t(i)$ denotes a sum of pump and chiller power consumed by chiller at time t which is a function of the chiller load and chilled water setpoint at that time t, $PLR_t$ denotes a Part Load Ratio of each chiller at time t, $Q_{cap}(i)$ denotes a maximum cooling capacity of chiller i, $Tchwl_t(i)$ denotes the leaving chilled liquid temperature setpoint of the chillers at time t;

scheduling (i) turning ON or turning OFF each chiller of the first set of chillers and (ii) the LCWT for each chiller of the first set of chillers based on: (i) the required cooling load to be provided by the first set of chillers, and (ii) the ambient temperature associated with the building; and controlling, using the trained deep RL agent deployed in the BMS of the building, each chiller of the first set of chillers at specific time intervals using the sensor readings, based on the scheduling to obtain the required cooling load and the ambient temperature associated with the building.

2. The processor implemented method as claimed in claim 1, wherein the design parameters comprise the maximum cooling capacity in watts that is satisfied by each chiller of the first set of chillers and the second set of chillers, and a co-efficient of performance (COP) of each chiller of the first set of chillers and the second set of chillers.

3. A system to schedule a multi-chiller, in a multi-chiller plant in a building, using reinforcement learning with transfer learning for power consumption prediction, the system comprising:

a memory storing instructions;
one or more communication interfaces; and
one or more hardware processors coupled to the memory via the one or more communication interfaces, wherein the one or more hardware processors are configured by the instructions to:

obtain an input data comprising time series data pertaining (i) design parameters of a first set of chillers deployed in the building, (ii) a leaving chilled water temperature (LCWT) of each chiller of the first set of chillers, and (iii) a required cooling load provided by each chiller of the first set of chillers collected for a pre-defined time-interval;

train a transfer learning (TL) model based on (i) design parameters of a second set of chillers with different capacities, each chiller of the second set of chillers being run at a single set point, (ii) a LCWT of each chiller of the second set of chillers, (iii) a required cooling load provided by the second set of chillers, to obtain a pre-trained TL model, wherein the second set of chillers are similar to the first set of chillers, the second set of chillers being chosen using K-means clustering algorithm;

train the pre-trained transfer learning (TL) model based on the input data with to obtain a re-trained TL model with learning of relationship of the chiller's power with respect to the LCWT of each chiller of the second set of chillers and the required cooling load of each chiller of the second set of chillers, wherein the re-trained TL model comprises a plurality of layers divided into groups comprising initial layers, layers in middle, and final layers, wherein a same learning rate is used for each layer in a group and each group is given a different learning rate, wherein values of learning rates decrease as there is a progression from the initial layers to the final layers, and wherein the re-trained TL model is used for predicting power consumed by each of the first set of chillers for a specified LCWT and for at least one new set point;

train a deep reinforcement learning (RL) agent using the re-trained TL model, wherein during the training of the deep RL agent using the re-trained TL model, the deep RL agent determines a reward function for each chiller of the first set of chillers and the determined reward function is used for training the deep RL agent, wherein to determine the reward function, the one or more hardware processors are configured by the instructions to:

assign a negative reward based on at least one of: if the deep RL agent takes an action which results in the required cooling load not being met, and when minimum ON period constraint, minimum OFF period constraint, and chiller availability constraint are not met, and assign a positive reward in a nominal range if the deep RL agent takes other actions proportional to difference between a maximum power consumption and power consumption corresponding to the action, wherein to train the deep RL agent using the re-trained TL model, the one or more hardware processors are configured by the instructions to:

generate training data for a specific period to train the deep RL agent using a Deep Q-Network algorithm;

identify an 'epoch' length to split the training data into a plurality of episodes, wherein the 'epoch' length is varied or fixed according to the minimum ON period constraint; and train the deep RL agent using the reward function for a specific number of episodes of the plurality of episodes to schedule an ON state or an OFF state of each chiller of the first set of chillers and a chilled water set point of each chiller of the first set of chillers using sensor readings obtained in real-time including an ambient temperature associated with the building, the LCWT of each chiller of the first set of chillers, a returned chilled water temperature (RCWT) of each chiller of the first set of chillers, and mass flow rates of each chiller of the first set of chillers, and wherein the deep RL agent is trained using the re-trained TL model to capture the effect of operating each of the first set of chillers at different conditions using an exploration strategy based on an epsilon-decay exploration; and deploying, by the one or more hardware processors, the trained deep RL agent in a Building Management System (BMS) of the building, wherein the trained deep RL agent is configured to control each chiller of the first set of chillers in real-time by:

reading (i) the LCWT of each chiller of the first set of chillers, (ii) the RCWT of each chiller of the first set of chillers, (iii) the ambient temperature associated with the building, and (iv) the mass flow rates of each chiller of the first set of chillers;

determining a required cooling load to be provided by the first set of chillers is calculated from the chilled water leaving temperature ($Tchwl_t$), return chilled water temperature ($Tchwr_t$) and mass flow rate ($m_t$) as $Q_t = \dot{m}_t c_p (Tchwr_t - Tchwl_t)$, where $c_p$ is a specific heat of chilled water, wherein minimizing the required cooling load is stated as min $\Sigma_{i=0}^{i=n} c_t(i) P_t(i)$, where $c_t(i)$ denotes ON/OFF state of chiller denoted by binary 1 or 0, $P_t(i) = f(PLR_t, Qcap(i), Tchwl_t)$, where $P_t(i)$ denotes a sum of pump and chiller power consumed by chiller at time t which is a function of the chiller load and chilled water setpoint at that time t, $PLR_t$ denotes a Part Load Ratio of each chiller at time t, $Q_{cap}(i)$ denotes a maximum cooling capacity of chiller i, $Tchwl_t(i)$ denotes the leaving chilled liquid temperature setpoint of the chillers at time t;

scheduling (i) turning ON or turning OFF each chiller of the first set of chillers and (ii) the LCWT for each chiller of the first set of chillers based on: (i) the required cooling load to be provided by the first set of chillers, and (ii) the ambient temperature associated with the building; and controlling, using the trained deep RL agent deployed in the BMS of the building, each chiller of the first set of chillers at specific time intervals using the sensor readings, based on the scheduling to obtain the required cooling load and the ambient temperature associated with the building.

4. The system as claimed in claim 3, wherein the design parameters comprise the maximum cooling capacity in watts that is satisfied by each chiller of the first set of chillers and a second set of chillers, and a co-efficient of performance (COP) of each chiller of the first set of chillers and the second set of chillers.

5. A computer program product comprising a non-transitory computer readable medium having a computer readable program embodied therein, wherein the computer readable program, when executed on a computing device, causes the computing device to: schedule a multi-chiller, in a multi-chiller plant in a building, using reinforcement learning with transfer learning for power consumption prediction by:

obtaining, by one or more hardware processors, an input data comprising time series data pertaining (i) design parameters of a first set of chillers deployed in the building, (ii) a leaving chilled water temperature (LCWT) of each chiller of the first set of chillers, and (iii) a required cooling load provided by each chiller of the first set of chillers collected for a pre-defined time-interval;

training, by the one or more hardware processors, a transfer learning (TL) model based on (i) design parameters of a second set of chillers with different capacities, each chiller of the second set of chillers being run at a single set point, (ii) a LCWT of each chiller of the second set of chillers, (iii) a required cooling load provided by the second set of chillers, to obtain a pre-trained TL model, wherein the second set of chillers are similar to the first set of chillers, the second set of chillers being chosen using K-means clustering algorithm;

training, by the one or more hardware processors, the pre-trained transfer learning (TL) model based on the input data to obtain a re-trained TL model with learning of a relationship of the chiller's power with respect to the LCWT of each chiller of the second set of chillers and the required cooling load of each chiller of the second set of chillers, wherein the re-trained TL model comprises a plurality of layers divided into groups comprising initial layers, layers in middle, and final layers, wherein a same learning rate is used for each layer in a group and each group is given a different learning rate, wherein values of learning rates decrease as there is a progression from the initial layers to the final layers, and wherein the re-trained TL model is used for predicting power consumed by each of the first set of chillers for a specified LCWT and for at least one new set point;

training, by the one or more hardware processors, a deep reinforcement learning (RL) agent using the re-trained TL model, wherein during the training of the deep RL agent using the re-trained TL model, the deep RL agent determines a reward function for each chiller of the first set of chillers and the determined reward function is used for training the deep RL agent, wherein determining the reward function comprises:

assigning a negative reward based on at least one of: if the deep RL agent takes an action which results in the required cooling load not being met, and when minimum ON period constraint, minimum OFF period constraint, and chiller availability constraint are not met, and assigning a positive reward in a nominal range if the deep RL agent takes other actions proportional to difference between a maximum power consumption and power consumption corresponding to the action, wherein training the deep RL agent using the re-trained TL model comprises:

generating training data for a specific period to train the deep RL agent using a Deep Q-Network algorithm;

identifying an 'epoch' length to split the training data into a plurality of episodes, wherein the 'epoch' length is varied or fixed according to the minimum ON period constraint; and training the deep RL agent using the reward function for a specific number of episodes of the plurality of episodes for scheduling an ON state or an OFF state of each chiller of the first set of chillers and a chilled water set point of each chiller of the first set of chillers using sensor readings obtained in real-time including an ambient temperature associated with the building, the LCWT of each chiller of the first set of chillers, a returned chilled water temperature (RCWT) of each chiller of the first set of chillers, and mass flow rates of each chiller of the first set of chillers, and wherein the deep RL agent is trained using the re-trained TL model to capture the effect of operating each of the first set of chillers at different conditions using an exploration strategy based on an epsilon-decay exploration; and deploying, by the one or more hardware processors, the trained deep RL agent in a Building Management System (BMS) of the building, wherein the trained deep RL agent controls each chiller of the first set of chillers in real-time by:

reading (i) the LCWT of each chiller of the first set of chillers, (ii) the RCWT of each chiller of the first set of chillers, (iii) the ambient temperature associated with the building, and (iv) the mass flow rates of each chiller of the first set of chillers;

determining a required cooling load to be provided by the first set of chillers is calculated from the chilled water leaving temperature ($Tchwl_t$), return chilled water temperature ($Tchwr_t$) and mass flow rate ($m_t$) as $Q_t = \dot{m}_t c_p (Tchwr_t - Tchwl_t)$, where $c_p$ is a specific heat of chilled water, wherein minimizing the required cooling load is stated as $\min \Sigma_{i=0}^{i=n} c_t(i) P_t(i)$, where $c_t(i)$ denotes ON/OFF state of chiller denoted by binary 1 or 0, $$P_t(i) = f(PLR_t, Q\text{cap}(i), Tchwl_t),$$

where $P_t(i)$ denotes a sum of pump and chiller power consumed by chiller at time t which is a function of the chiller load and chilled water setpoint at that time t, $PLR_t$ denotes a Part Load Ratio of each chiller at time t, $Q_{cap}(i)$ denotes a maximum cooling capacity of chiller i, $Tchwl_t(i)$ denotes the leaving chilled liquid temperature setpoint of the chillers at time t;

scheduling (i) turning ON or turning OFF each chiller of the first set of chillers and (ii) the LCWT for each chiller of the first set of chillers based on: (i) the required cooling load to be provided by the first set of chillers, and (ii) the ambient temperature associated with the building; and controlling, using the trained deep RL agent deployed in the BMS of the building, each chiller of the first set of chillers at specific time intervals using the sensor readings, based on the scheduling to obtain the required cooling load and the ambient temperature associated with the building.

6. The computer program product comprising the non-transitory computer readable medium of claim 5, wherein the design parameters comprise the maximum cooling capacity in watts that is satisfied by each chiller of the first set of chillers and the second set of chillers, and a co-efficient of performance (COP) of each chiller of the first set of chillers and the second set of chillers.

* * * * *